(12) United States Patent
Freed et al.

(10) Patent No.: US 7,275,093 B1
(45) Date of Patent: Sep. 25, 2007

(54) METHODS AND DEVICE FOR MANAGING MESSAGE SIZE TRANSMITTED OVER A NETWORK

(75) Inventors: Michael Freed, Arlington Heights, IL (US); Satish Amara, Mount Prospect, IL (US)

(73) Assignee: 3 Com Corporation, Marlborough, MA (US)

( * ) Notice: Subject to any disclaimer, the term of this patent is extended or adjusted under 35 U.S.C. 154(b) by 0 days.

(21) Appl. No.: 09/559,883

(22) Filed: Apr. 26, 2000

(51) Int. Cl.
*G06F 15/173* (2006.01)

(52) U.S. Cl. ............... 709/223; 709/224; 370/470; 370/474

(58) Field of Classification Search ............ 709/236, 709/230, 237, 238, 223–224; 710/52; 711/171, 711/172; 370/465, 468, 470–472, 474
See application file for complete search history.

(56) References Cited

U.S. PATENT DOCUMENTS

| 5,809,254 | A  | * | 9/1998  | Matsuzono ............... 709/235 |
| 5,937,169 | A  | * | 8/1999  | Connery et al. ........... 709/250 |
| 6,141,550 | A  | * | 10/2000 | Ayabe et al. ............... 455/433 |
| 6,185,208 | B1 | * | 2/2001  | Liao ........................ 370/392 |
| 6,212,190 | B1 | * | 4/2001  | Mulligan .................... 370/400 |
| 6,298,041 | B1 | * | 10/2001 | Packer ....................... 370/231 |
| 6,327,626 | B1 | * | 12/2001 | Schroeder et al. .......... 709/236 |
| 6,477,143 | B1 | * | 11/2002 | Ginossar .................... 370/230 |
| 6,564,267 | B1 | * | 5/2003  | Lindsay .................... 709/250 |
| 6,707,799 | B1 | * | 3/2004  | Chui ........................ 370/282 |
| 6,891,855 | B2 | * | 5/2005  | Bruckman .................. 370/468 |
| 6,934,288 | B2 | * | 8/2005  | Dempo ....................... 370/394 |
| 2002/0136217 | A1 | * | 9/2002 | Christensen ................ 370/393 |

FOREIGN PATENT DOCUMENTS

WO     WO 00/67433    * 11/2000

OTHER PUBLICATIONS

Postel, J., "The TCP Maximum Segment Size and Related Topics", rfc879, dated Nov. 1983, printed from web site Http://rfc.sunsite.dk/rfc/rfc879.html.*
Clark, D., "Window and Acknowledgment Strategy in TCP", rfc813, dated Jul. 1982, printed from web site http://www.faqs.org/rfcs/rc813.html.*

* cited by examiner

*Primary Examiner*—William Vaughn
*Assistant Examiner*—LaShonda Jacobs
(74) *Attorney, Agent, or Firm*—McDonnell Boehnen Hulbert & Berghoff LLP

(57) ABSTRACT

Methods and a device for changing the message size broadcast over a network and furthermore preventing fragmentation in networks are provided. The device intercepts a message transported across a network, wherein the message is sent from a data source to a data receiver and changes the message size. In addition, the device may use the methods to change the message size of data transmitted over a network thus reducing fragmentation. As a result, network devices such as classifiers preferably avoid re-assembling fragments. More specifically by reducing re-assembling, network devices like a classifier can react more quickly to applications requiring information found in both of an IP and TCP/UDP header.

28 Claims, 8 Drawing Sheets

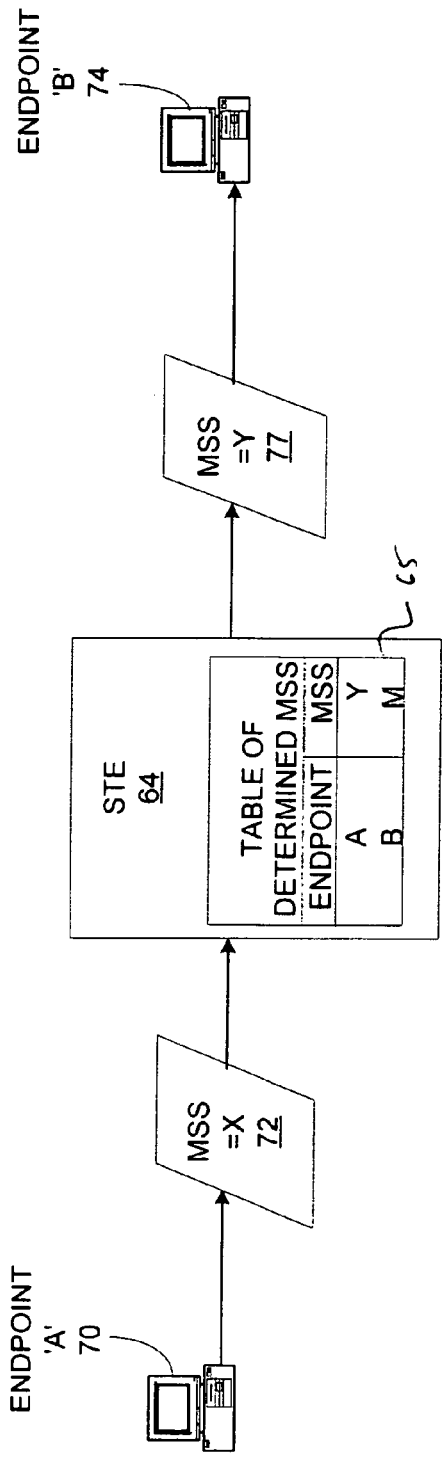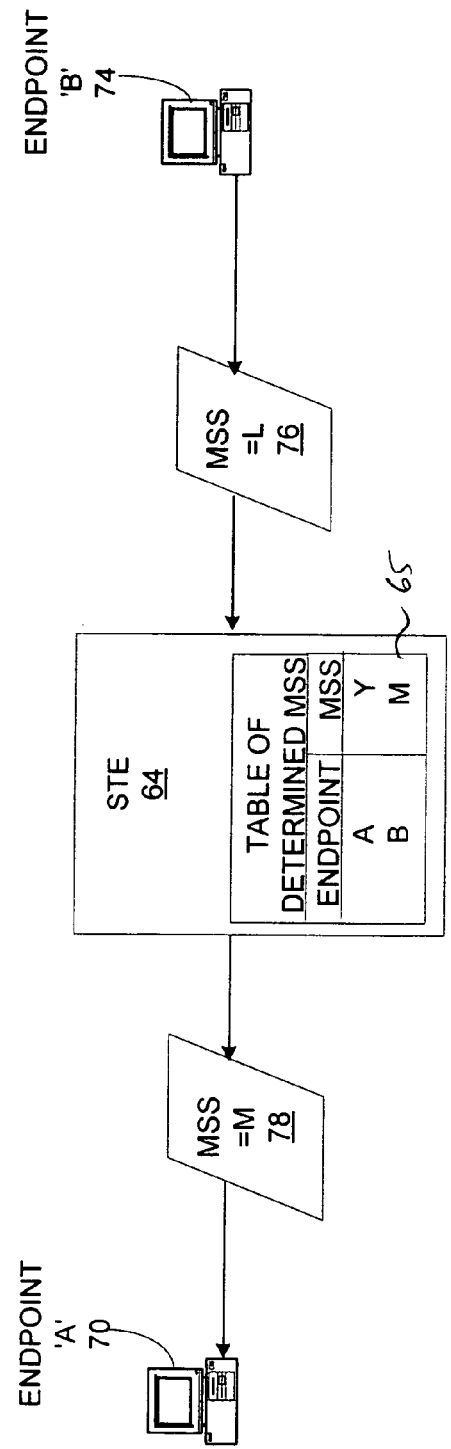

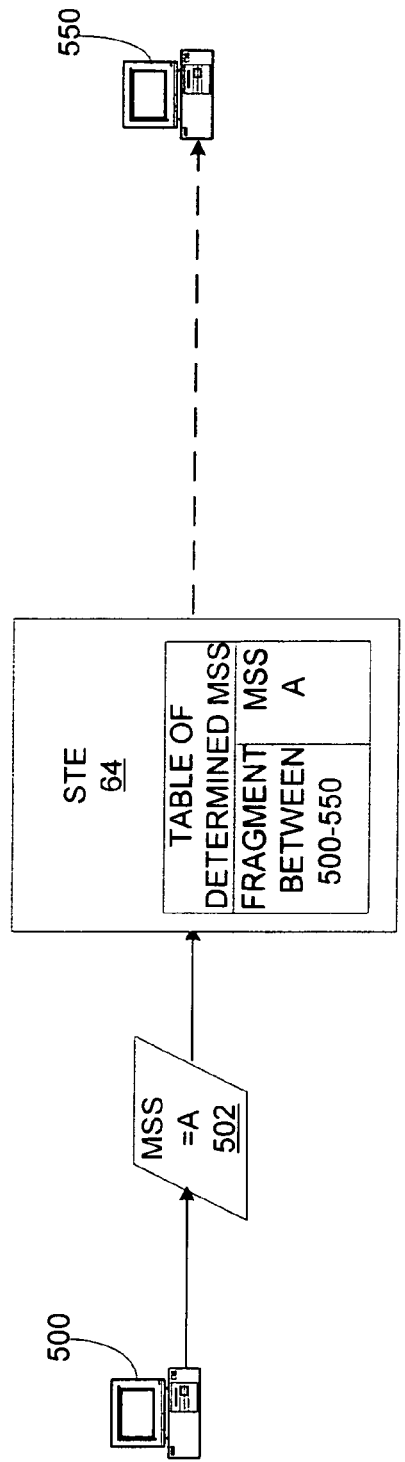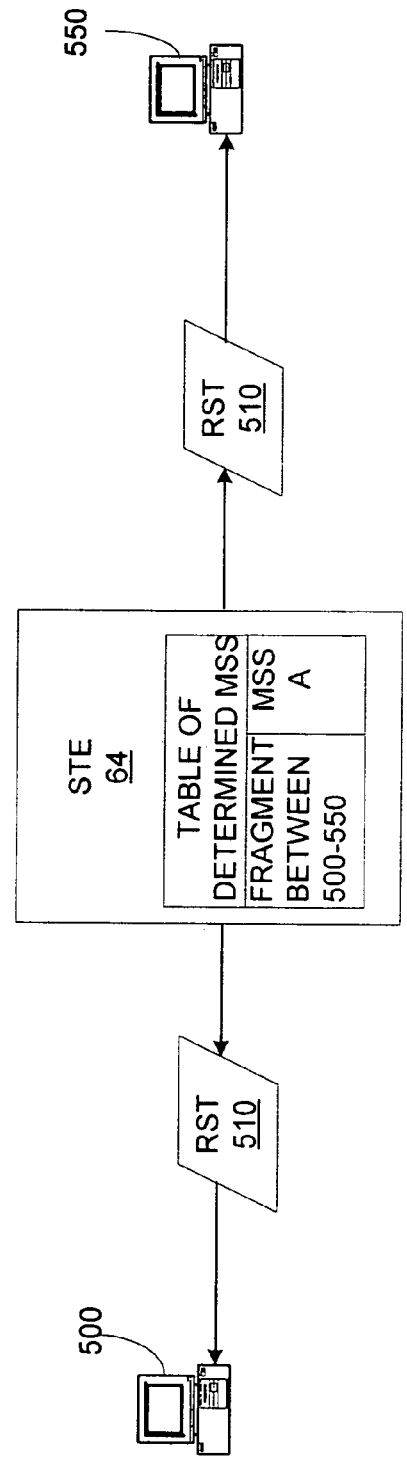

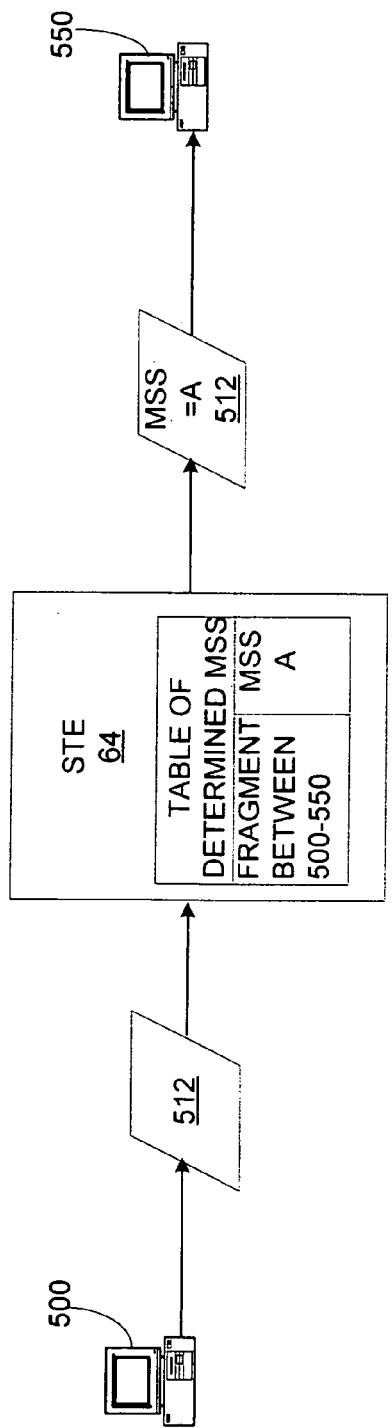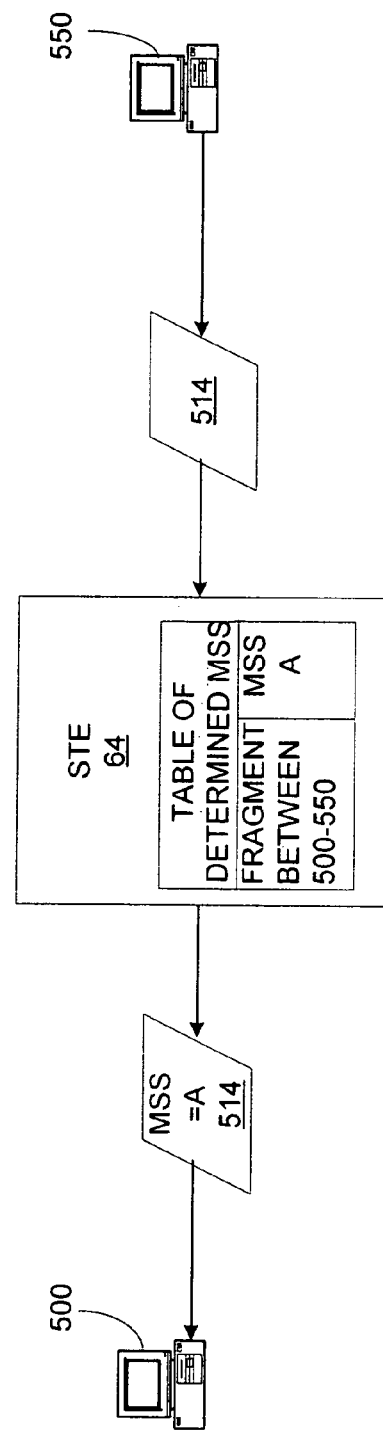

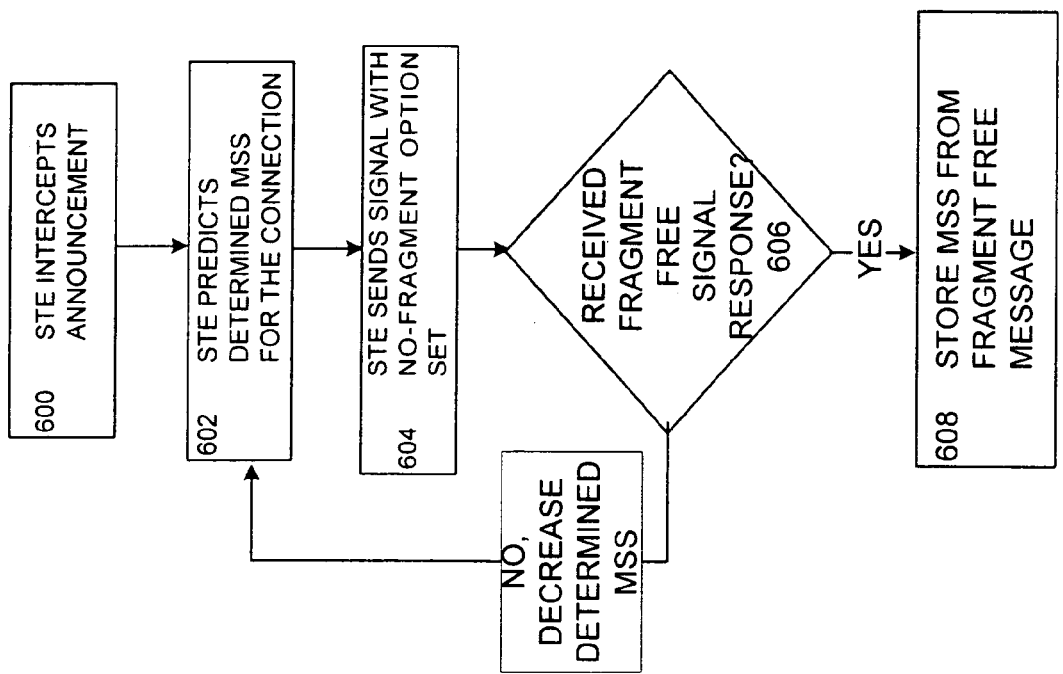

METHODS AND DEVICE FOR MANAGING MESSAGE SIZE TRANSMITTED OVER A NETWORK

FIELD OF INVENTION

This invention relates generally to the field of telecommunications and the process by which digital data are transmitted over computer networks. More particularly, the invention is directed to a device and methods for modifying digital data to reduce message fragmentation.

DESCRIPTION OF RELATED ART

It is an on-going challenge to keep pace with the current and potential threats and vulnerabilities in computing systems and interconnected networks such as the Internet. The network communication environment is constantly evolving and changing fueled by new technology and the unprecedented growth of the Internet. To make matters worse, threats and vulnerabilities in this environment are also constantly evolving. Recently, computer hackers have attacked computer networks with false message fragments clogging the network and causing system downtime. A number of popular websites such as Yahoo!, Amazon.com, and e-Bay have been temporarily disabled by such hacker attacks. An attack, such as a denial-of-service attack, brought on by a curious teenager, a disgruntled employee, espionage from a rival company, or even a foreign government can sabotage the networks draining corporations and people of critical information, theft of confidential information, cash, or other assets, possibly damaging public relations by downtime. As time progresses, it can be expected that attacks on popular websites using false message fragments may increase.

Typically, in data communication on a network a host (i.e., PC, workstation, mainframe, file server, etc.) will transmit digital data such as a message to another host connected to the same network. Often times, the message is transmitted over more than one network before it ends up at the final destination. Each network, such as the Ethernet, Token Ring, or the Internet usually has a network maximum transmission unit ("network MTU") measured in octets (i.e., an octet is an 8-bit word). That is, each network can carry a message no larger than its own network MTU. Thus, it is possible that messages transmitted between hosts must travel over a network where the message is larger than the particular network MTU. As a result, the message is first broken up into message fragments typically by a gateway device (i.e., device used to interconnect the various networks) where each message fragment size is compatible with the network MTU so that the gateway device can transmit the message fragments over the network. The process of breaking up the message into a number of smaller message fragments is referred to as message fragmentation.

Currently networks deal with message fragmentation by transmitting the fragments through the network and then re-assembling the fragments at the destination host to recover the original message. Allowing message fragments to flow to the final destination without re-assembling them into the original message is a typical example of how a gateway device (e.g., a router) presently performs. Because transmitting a message as a number of different fragments currently provides a network little ability to identify legitimate message fragments from bogus fragments sent to clog a network, a network can be vulnerable to attacks.

Applications like Network Address Translator ("NAT"), Port Address Translator ("PAT"), Internet Protocol Security ("IPSEC"), and Quality of Service ("QOS") are becoming increasingly popular. NAT, PAT, IPSEC, and QOS preferably depend upon a classifier, which identifies the messages that are to be serviced by these applications. To identify the messages that are to be serviced by common applications similar to NAT, PAT, IPSEC, and QOS the classifier depends on information given in the Internet Protocol ("IP") header, other protocol headers like the Transmission Control Protocol ("TCP") header, and port numbers. Upon fragmentation, the fragments do not necessarily contain all of the needed information, often times only the IP header. As a result, the fragments must be re-assembled before the classifier can classify and direct the message appropriately. Maintaining the queues and re-assembling the fragments may possibly introduce latency. Often times, latency is not suitable for network devices such as interim routers located between network endpoints.

In addition, since there are no guarantees about the order of arrival of information from the network, messages may not be immediately re-assembled and thus have to be stored until enough fragments arrive. Because storing message fragments and attempting to assemble messages from fragments consumes system resources, fragmented messages may clog a network and prevent it from receiving any other information.

SUMMARY OF THE INVENTION

Methods and a device herein are designed for changing the size of a message transported over a network and furthermore for preventing message fragmentation. The device, connected to the network, changes the maximum segment size of a message to a determined maximum segment size. Additionally, the device can reduce message fragmentation using methods such as those described herein.

In an exemplary embodiment, a device hereinafter referred to as a Smart Traffic Engineer ("STE"), intercepts a message transported from a data source to a data receiver. Preferably, STE modifies the size of the transmitted messages allowing the users of the network to tailor the message size according to the needs of the particular connection.

According to another embodiment, STE may also employ methods to provide a appropriate determined message size to reduce message fragmentation.

As a result, a STE can reduce fragmentation, thus saving gateways and other network devices, such as a classifier, re-assembly time and re-assembly buffer space. Furthermore, by reducing fragmentation on a network, STE can help reduce the likelihood of a service attack caused by a flood of message fragments. Thus, STE and the methods described herein prove to be useful by reducing fragmentation.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 3 are exemplary block diagrams illustrating the process of changing the MSS of an announcement;

FIGS. 6A, 6B, 6C, and 6D are exemplary block diagrams illustrating the process of determining MSS to reduce fragmentation; and FIG. 7 is an exemplary block diagram illustrating an alternative method of determining MSS to reduce fragmentation.

DETAILED DESCRIPTION OF AN ILLUSTRATIVE EMBODIMENT

Figure 1:
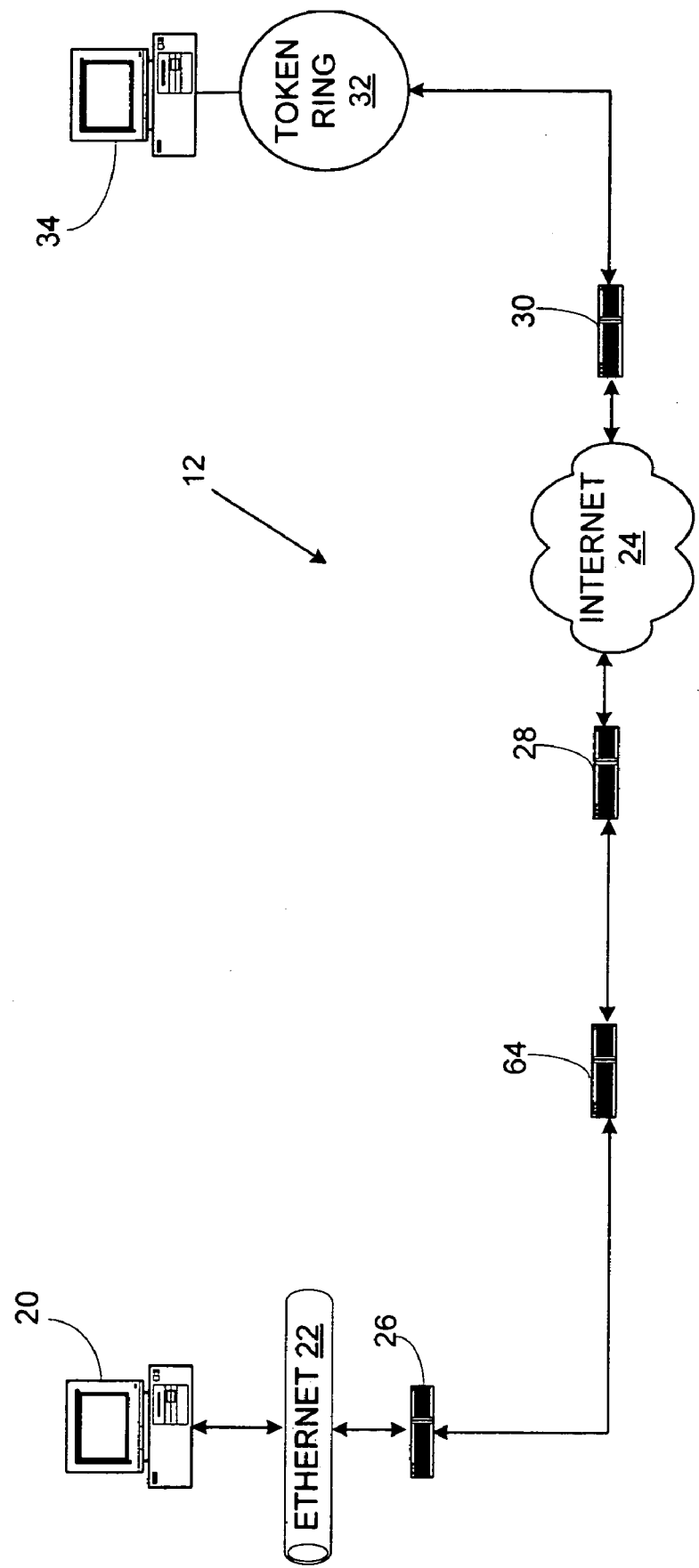
FIG. 1 is an exemplary block diagram illustrating a network utilizing an embodiment of the invention.

Referring now to FIG. 1, shown is an interconnected network system 12 utilizing an exemplary embodiment of the present invention. A first host or Customer Premise Equipment ("CPE") device 20 such as a personal computer communicates on a local area IEEE 802.3 Ethernet network 22 by transmitting bundles of digital information. The CPE 20 may be include a personal computer, a Voice-over-IP telephone, WebTV, an Internet appliance or another type of communication device capable of transmitting digital information. In this exemplary embodiment, the CPE 20 may transmit to other devices on the Ethernet network 22 by using the Ethernet IEEE 802.3 protocol.

The CPE 20 and Ethernet network 22 can also communicate to other digital computing devices outside the network 22 using the TCP/IP protocol for transmitting digital information across a network 24. To access an outside network such as the Internet 24, preferably a firewall 26 is placed between the Ethernet network 22 and the outside network, such as the public Internet 24, to provide appropriate network security, authentication and access. The firewall 26 can be embodied as software implemented as a router, a server, network access server providing access to the Ethernet network or other computer device arbitrating access to the network. In this example, the firewall 26 may also be combined with a classifier device identifying messages to be serviced by NAT, DAT, IPSEC and QOS. To provide connections through the various networks and create the network infrastructure, a number of network devices such as gateways, bridges, routers 28, 30 are provided. These network devices 28, 30 provide the connections between different networks such as the Ethernet Network 22, Internet 24, and Token Ring Network 32. Such network infrastructure equipment is available from a number of vendors such as the 3Com Corporation of Santa Clara, Calif.

A second CPE device 34 communicates on a second type of network such as an IEEE 802.5 Token Ring Network 34. A Token Ring Network 34 provides communication on a local area network between a number of computer CPE devices. In order to utilize a message size appropriate to both the Ethernet 22 and the Token Ring networks 32, the networks 22, 32 may typically agree to transmit a message size that can be carried by both networks. For instance, the two networks can use a message Maximum Transmission Unit size ("MTU") equal to the minimum size of messages that can be handled by the two networks 22, 32. For instance, if the Ethernet network 22 has an MTU of 1500 octets and the Token Ring network 32 has an MTU of 4000 octets, the two CPEs preferably agree to send messages that are 1500 octets in length. As a result, the CPE 34 on the Token Ring network would preferably transmit messages that are 1500 octets in length to the CPE 20 on the Ethernet. Likewise, the CPE 20 on the Ethernet network 22 would preferably transmit messages that are 1500 octets in length to the CPE 34 on the Token Ring network.

Information passed from a data source 20, 34 to a data receiver 20, 34 preferably uses a network protocol such as the Internet Protocol ("IP") to send data within the network 12. The network protocol generally defines two basic categories of network devices, or nodes. One category is made up of hosts 20, 34, which include PCs, workstations, mainframes, file servers, and other CPEs, which may originate and receive digital information. The other category is made up of gateways 28, 30 (e.g., routers), which transport and forward data bundles between hosts and other routers in order to allow hosts not connected to the same link to communicate.

Messages transmitted from a data source 20,34 to a data receiver 20,34 on a network 12 may include an IP header or Network layer header, a Transmission Control Protocol header ("TCP") header or Transport layer header, an Application layer header, and data. If necessary, the message may be divided up into data bundles by the data source 20, 34 such that the data bundles preferably have a message Maximum Transmission Unit ("message MTU") size. For example, an Ethernet network 22 typically has a network MTU of 1500 octets and is thus capable of carrying a message MTU of 1500 octets. In comparison, a Token Ring network 32 typically has a network MTU of 4000 octets capable of carrying a message MTU of 4000 octets. Because transferring larger data bundles are typically more efficient than small ones (unless it causes fragmentation), it is often desirable to use the largest possible message MTU.

The Maximum Segment Size ("MSS") is typically equal to message MTU minus the IP/TCP header overhead. For example, referring to FIG. 2, in a network implemented with the widely utilized TCP/IP protocol, the overhead 56 in a digital message packet 62 is typically 40 octets (assuming there are 20 octets in each of the IP header 50 and TCP header 52). Digital information 54 is MSS 58 in length and the message 62 is MTU 60 in length. Thus, by changing MSS 58, MTU 60 also changes accordingly. Additional details regarding TCP/IP will be further described herein.

Figure 2:
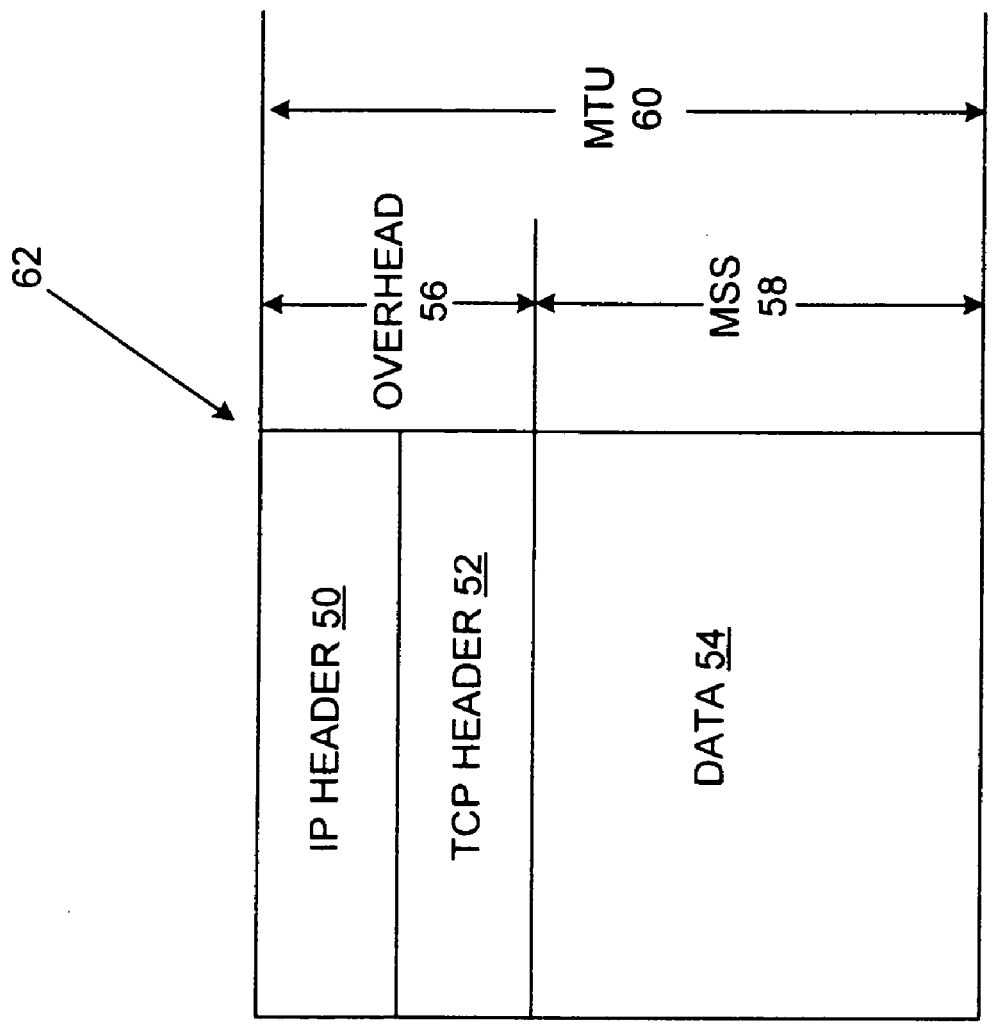
FIG. 2 is an exemplary block diagram illustrating a message format utilized by an embodiment of the invention.

Now referring to FIG. 1, information passing from the second CPE device 34 to the first CPE device 20 is transmitted over a transport network 24, shown as the Internet 24 in this example. Preferably, a Smart Traffic Engineer ("STE") 64 is a network device placed within the network preferably along the path of the message carried by the network 12. In the preferred embodiment, the STE 64 dynamically manages the size of data traffic messages transmitted through the outside network 24 to improve network system performance. For instance, the STE 64 intercepts an announcement message, typically a message at the start of the data stream, transmitted between the data source 20, 34 and the data receiver 20, 34. The STE 64 dynamically modifies or changes in the announcement the transmitted message's Maximum Segment Size ("MSS") to a value determined by the STE 64. Because the MSS is equal to the message MTU minus the header overhead of the message as shown in FIG. 2, STE 64 effectively changes the message's MTU. The message MTU can be modified such that is smaller, equal to, or greater than network MTUs. Modifying the MTU of transmitted messages allows the users of the network to tailor the message size according to the needs of the particular network connection.

After changing the MSS in the announcement, the STE 64 preferably recalculates the checksum in the TCP header to include the newly determined MSS. STE 64 preferably stores the determined Maximum Segment Sizes for various data source 20,34 to data receiver 20,34 connections. For later connections between the particular data service and data receiver, the STE 64 may look up the stored MSS of specific data source 20,34 to data receiver 20,34 connections and utilize the appropriate stored MSS.

An exemplary embodiment a method used by STE 64 to change the MSS on a connection between a data source and a data receiver may include receiving an announcement between the data source and the data receiver and modifying or setting the maximum segment size of the first announcement of the first connection with a determined maximum segment size.

FIGS. 3A and 3B illustrate an exemplary method of the STE 64 modifying the MSS to a determined value. Referring first to FIG. 3A, assume STE 64 has a determined MSS programmed as MSS=Y for Endpoint 'A' 70. The determined MSS can be stored in a memory location such as RAM, EEPROM, in a data structure, a database or a programmable logic device (PLD) within STE 64 or in connection to STE 64. FIG. 3A illustrates an STE 64 with a programmed lookup table 65 containing the determined MSS for a particular endpoint. For this particular example, assume Endpoint 'A' 70 is a data source that can handle a MSS of X. Endpoint 'A' 70 initiates communication to Endpoint 'B' 74 by broadcasting an announcement 72 to Endpoint 'B' 74 as the data receiver. The announcement 72 preferably contains the MSS of X that Endpoint 'A' 70 can handle. STE 64 intercepts the announcement 72 and changes the MSS from X to a value programmed in the table of STE 64, given as Y. Endpoint 'B' 74 thus receives the announcement 77 with the changed MSS thus transparently believing Endpoint 'A' 70 can handle a message MSS of Y.

Likewise in FIG. 3B, Endpoint 'B' 74 typically broadcasts a MSS of L 76. STE 64, however, has a determined MSS programmed into a table 65 that indicates Endpoint 'B' 74 can utilize a MSS of M. STE 64 intercepts the announcement 76 and transparently changes the MSS from L to the determined value of M such that Endpoint 'B' 74 now utilizes a MSS equal to M. As a result, the data receiver 70, Endpoint 'A' in this case, receives an announcement 78 from Endpoint 'B' 74 with a changed MSS such that Endpoint 'A' operates under the assumption that Endpoint 'B' 74 can handle a message MSS of M according to the STE 64. Thus the connection can utilize a MSS equal to M as set by the STE 64.

In an exemplary embodiment, STE 64 uses the TCP header illustrated in Table 1 below to retrieve and/or set the MSS in an announcement between a data source and a data receiver as described above. The descriptions herein with respect to the TCP header are appropriate to for the present embodiment, however, it should be understood that in other embodiments using different packet networks such as ATM, X.25, ISDN, DSL, token ring, etc. will use different headers. The teaches provided herein with respect to TCP/IP can be extended to other types of networks.

The TCP header preferably includes at least 20 octets containing information such as the source "port number" 120 (i.e., the data source port number), destination "port number" 122 (i.e., the data receiver port number), and a "sequence number" 124. The port numbers maintain track of different connections that can take place at the same time, such as multiple file transfers, where each file transfer makes up one conversation. The data source and the data receiver create a port number corresponding to a particular connection. Each data bundle has a sequence number 124 used to put the arriving data bundles in the correct order at the data receiver and to notify the data receiver that each data bundle has arrived. TCP doesn't number the data bundles except for the first octet in the data bundle (except when SYN 140 is set). If SYN 140 is set, the sequence number is the initial sequence number ("ISN") and the first data octet has the sequence number ISN+1. So for example, if there are 500 octets of data in each data bundle, the first data bundle might be numbered 0 (ISN), the second 500 (ISN+1), the next 1000 (ISN+2), the next 1500 (ISN+3), etc. Preferably, when SYN is set in a data bundle, the data bundle is the start of the data stream between either the data source to the data receiver or the data receiver to the data source.

TABLE 1

| Source Port 120 | | | | | | | | | Destination Port 122 | | |
|---|---|---|---|---|---|---|---|---|---|---|---|
| Sequence Number 124 | | | | | | | | | | | |
| Acknowledgment Number 126 | | | | | | | | | | | |
| Data Offset 128 | Reserved 130 | URG 132 | ACK 134 | PSH 136 | RST 138 | SYN 140 | FIN 142 | Window | | | 44 |
| Checksum 146 | | | | | | Urgent Pointer 148 | | | | | |
| Options 150 | | | | | | Padding 152 | | | | | |
| data 68 | | | | | | | | | | | |

Table 2 below contains the definitions and bit size of the fields located within the TCP header given in Table 1. Each field has a purpose that enables TCP to fulfill its responsibilities. Such responsibilities include making up for IP's deficiencies by providing reliable, stream-oriented connections. STE 46 uses TCP to extract information to identify an announcement (i.e., SYN 140 is set) and retrieve and/or set MSS from the Options field 150. STE 46 preferably recalculates the header checksum 146 if the TCP header contains a newly placed determined MSS.

TABLE 2

| | |
|---|---|
| Source Port (16 bits) 120: | The source port number. |
| Destination Port (16 bits) 122: | The destination port number. |
| Sequence Number (32 bits) 124: | The sequence number of the first data octet in this segment |
| Acknowledgment Number (32 bits) 126: | If the ACK control bit is set this field contains the value of the next sequence number the sender of the segment is expecting to receive. Once a connection is established this is always |

TABLE 2-continued

| | sent. |
|---|---|
| Data Offset (4 bits) 128: | The number of 32 bit words in the TCP Header. This indicates where the data begins. |
| Reserved (6 bits) 130: | Reserved for future use. Must be zero. |
| URG (1 bit) 132: | Urgent Pointer field significant |
| ACK (1 bit) 134: | Acknowledgment field significant |
| PSH (1 bit) 136: | Push Function |
| RST (1 bit) 138: | STE uses this bit to Reset the connection. |
| SYN (1 bit) 140: | Synchronize sequence numbers. |
| FIN (1 bit) 142: | No more data from sender. |
| Window (16 bits) 144: | The number of data octets beginning with the one indicated in the acknowledgment field which the sender of this segment is willing to accept. |
| Checksum (16 bits) 146: | This gives the TCP protection against misrouted segments. This information is carried in the Internet Protocol and is transferred across the TCP/Network interface in the arguments or results of calls by the TCP on the IP. |
| Urgent Pointer (16 bits) 148: | This field communicates the current value of the urgent pointer as a positive offset from the sequence number in this segment. The urgent pointer points to the sequence number of the octet following the urgent data. This field is only interpreted in segments with the URG control bit set. |
| Options (variable) 150: | Options may occupy space at the end of the TCP header and are a multiple of 8 bits in length. All options are included in the checksum. An option may begin on any octet boundary. MSS can be placed in this field. |

TCP uses control flags otherwise known as URG 132, ACK 134, PSH 136, RST 138, SYN 140, and FIN 142 to manage connections between a data source and data receiver. Some flags, such as the URG flag 132, indicate valid data in the Urgent Pointer field 148. Two flags, SYN 140 and FIN 142, enable reliable delivery as they mark the beginning (SYN 140 marks the beginning) and the end (FIN 142 marks the end) of the data stream. In order to insure reliable delivery of the two flags, they are assigned spots in the Sequence Number field 124. STE uses RST 138 to reset the connection between a data source and a data receiver, if necessary.

The endpoints of a TCP connection, a data source and a data receiver (possibly the same CPE), preferably utilize a buffer for storing data that is transmitted over the network before the application is ready to process the data. To avoid overflowing the buffer, TCP sets a Window Size field 144 for each data bundle. The Window Size field 144 contains the amount of data that may be transmitted into the buffer. If the number falls to zero, the data source TCP can send no more data. The data source must wait until buffer space becomes available and it receives a data bundle announcing a non-zero window size.

When a data source transmits a data bundle to a data receiver, the data source must wait a period of time for an acknowledgment from the data receiver. If the reply does not come within the allotted time period, the data bundle is assumed lost and the data bundle is retransmitted.

In an exemplary embodiment, TCP sends each data bundle generated to IP, while providing IP the Internet address of the data receiver. Therefore, IP's task is simply to find a route for the data bundle and get it to the data receiver.

In order to allow gateways or other intermediate systems to forward the data bundle, IP adds its own header, namely an IP header.

Table 3 below illustrates an IP header, where the main fields in the IP header include the Source 220 and Destination 222 Internet address (e.g., a 32-bit address, like 128.6.4.194), the Protocol number 216, and a Header checksum 218. The Protocol number 216 tells IP at the data receiver to send the data bundle to TCP, so as not to send the data bundle to other protocols that use IP, such as User Datagram Protocol, hereinafter UDP. The Header checksum 218 allows IP at the data receiver to verify that the IP header wasn't damaged in transit.

TABLE 3

| Vers = 4 200 | IHL 202 | Type of Service 204 | Total Length 206 |
|---|---|---|---|
| Identification 208 | | Flags 210 | Fragment Offset 212 |
| Time to Live 214 | Protocol 216 | Header Checksum 218 | |
| Source Address 220 | | | |
| Destination Address 222 | | | |
| IP Options 224 | | | |
| TCP Header 226 | | | |
| Data 68 | | | |

Additional definitions of the fields within an IP header as shown in Table 3 are described in Table 4. More importantly, the Flags field 210 and the Fragment Offset field 212 are used to divide large data bundles into small chunks, called fragments, for traversing networks that are unable to handle large data bundles. The Identification field 208 is a unique value chosen by the data source to allow a data receiver to re-assemble a Data bundle that had to be chopped up into fragments.

TABLE 4

| Version (4 bits) 200: | The Version field indicates the format of the internet header. This document describes version 4. |
|---|---|
| IHL (4 bits) 202: | Internet Header Length is the length of the internet header in 32 it words, and thus points to the beginning of the data. |

TABLE 4-continued

| | |
|---|---|
| Type of Service (8 bits) 204: | The Type of Service provides an indication of the abstract parameters of the quality of service desired. |
| Total Length (16 bits) 206: | Total Length is the length of the data bundle, measured in octets, including internet header and data. All hosts must be prepared to accept data bundles of up to 576 octets. |
| Identification (16 bits) 208: | An identifying value assigned by the sender to aid in assembling the fragments of a data bundle. |
| Flags (3 bits) 210: | Various Control Flags. |
| Fragment Offset (13 bits) 212: | This field indicates where in the data bundle this fragment belongs. The fragment offset is measured in units of 8 octets (64 bits). The first fragment has offset zero. |
| Time to Live (8 bits) 214: | This field indicates the maximum time the data bundle is allowed to remain in the internet system. If this field contains the value zero, then the data bundle must be destroyed. |
| Protocol (8 bits) 216: | This field indicates the next level protocol used in the data portion of the internet data bundle. |
| Header Checksum (16 bits) 218: | A checksum on the header only. |
| Source Address (32 bits) 220: | The source address. See section 3.2. |
| Destination Address (32 bits) 222: | The destination address. See section 3.2. |
| Options (variable) 224: | In some environments the security option may be required in all data bundles. |

The reliability of the service provided by IP is best effort, therefore IP makes no guarantee that the IP data bundle or message will arrive at the data receiver without error.

In a network utilizing TCP/IP protocol, fragmentation occurs when the data bundle or message is too large to fit within the link (i.e., network) MTU, as determined by the Total length field (206 in Table 4). However, when the no-fragment option bit is set within the IP header, the data bundle is not fragmented, but instead discarded and not delivered as intended. A message is sent to the data source indicating that the data receiver was unreachable. The message typically comes from a device that had a cause to split the data bundle up into fragments to further move the message closer to the data receiver.

When a node intercepts a data bundle that must be fragmented it first divides the data bundle into fragments that are within the link MTU size. Secondly, the node prepends a copy of the IP header to each fragment, setting the IP Fragment Offset field (212 in Table 4), setting the IP Total Length field (206 in Table 4), and setting IP More Fragments bit to 0 for the last fragment and 1 for all others. Therefore, the first message fragment has the original IP and TCP header while other message fragments have a copy of the IP header.

Fragments with the same IP source address, Destination address, Protocol and Identification fields are placed within the same re-assembly buffer at the next node. When all of the fragments are received, the original data bundle or message is recovered and further processed. If all of the fragments do not arrive within a reasonable period of time, the buffer is freed and any fragments obtained are discarded.

Figure 4:
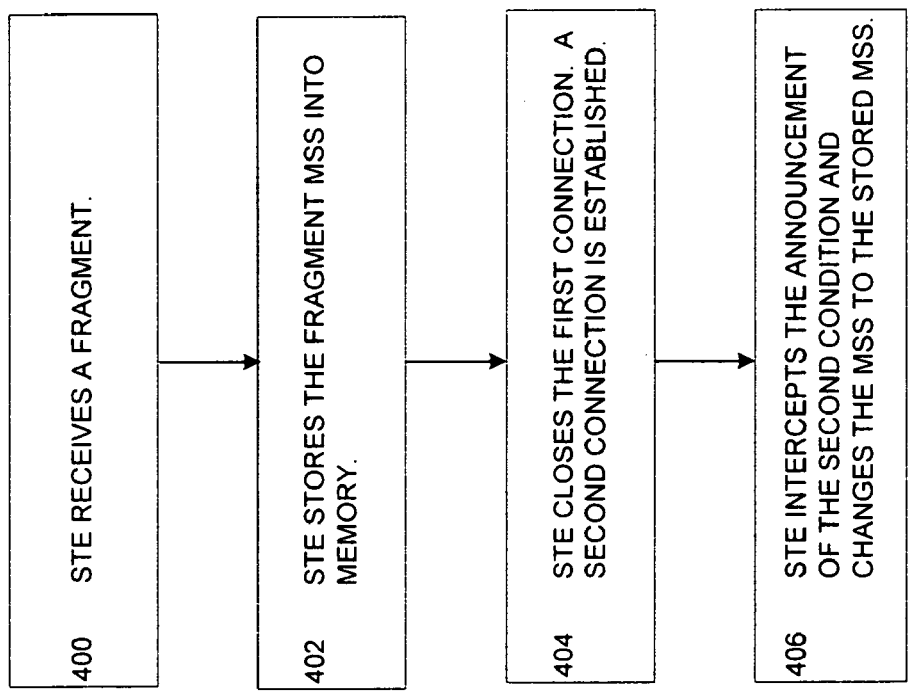
FIG. 4 is an exemplary block diagram illustrating the method of determining MSS to reduce fragmentation.

Thus in a preferred embodiment, referring now to FIG. 4, a method of changing MSS includes the steps of receiving a first fragment sent from the data source 400. At step 402, the STE preferably stores the MSS located in the first fragmented message TCP header under the Options field 150 of the TCP header as previously described above. STE can store the MSS in a memory storage device such as RAM, EEPROM, PLD, and database in a form such as a lookup table. At Step 404, STE resets the first connection by sending TCP data bundles with RST bit set (138 in Table 1) to the data source and the data receiver. Once the message with the RST bit set takes effect, both ends of the connection are aware that the connection has closed and will reattempt another connection. As a result, the data receiver and data source attempt to establish a second connection, both announcing their MSS sizes. At step 406, the STE intercepts the announcement and modifies the MSS value in the second connection announcement to correspond to the stored MSS value. Using the appropriate stored MSS value can reduce fragmentation on the connection.

Figure 5:
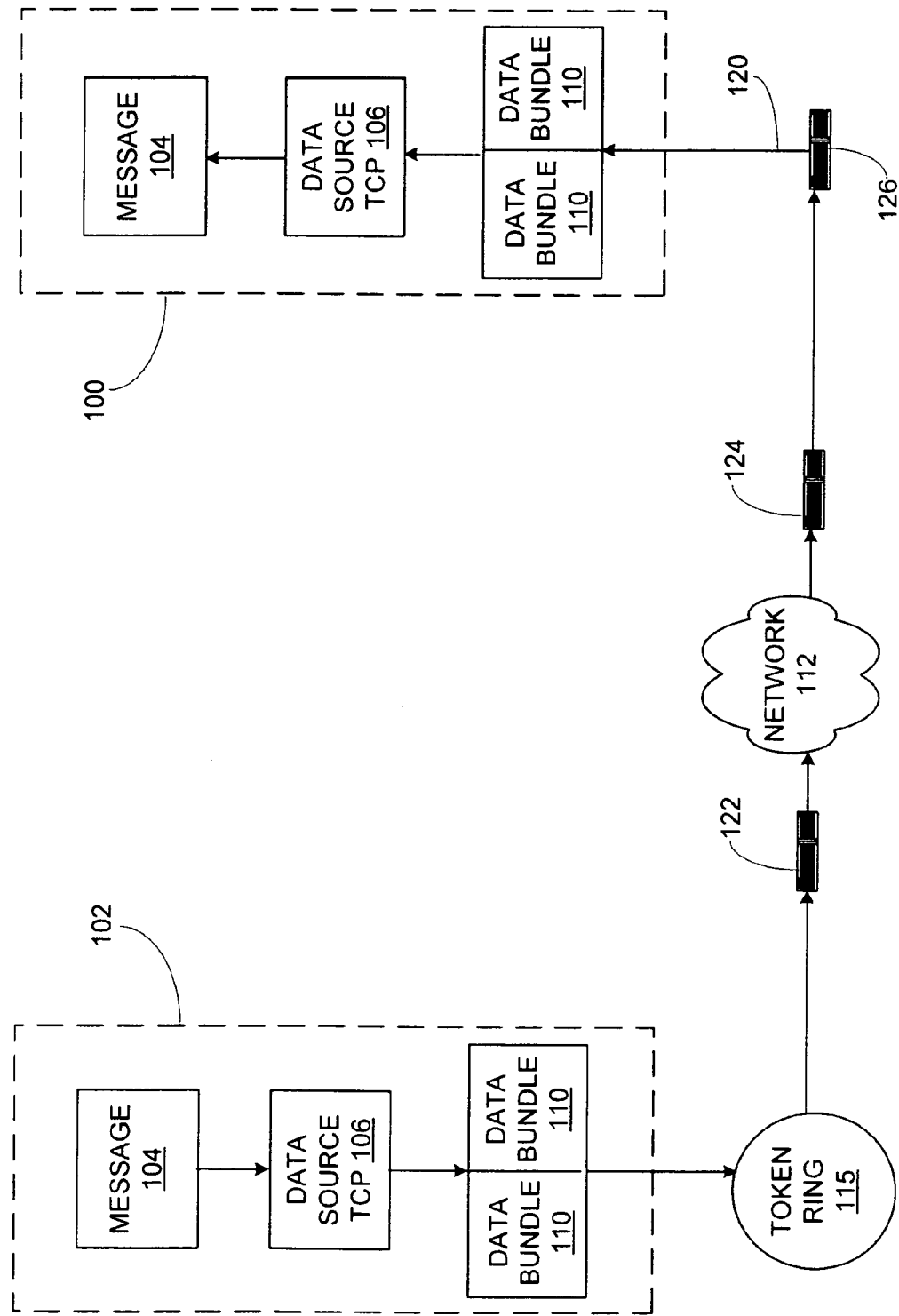
FIG. 5 is an exemplary block diagram illustrating the process of determining MSS to reduce fragmentation.

According to another aspect of the present embodiments, the appropriate MSS value for a particular connection can be determined in order to reduce fragmentation on the connection. In an exemplary embodiment illustrated in FIG. 5, STE 126 utilizes the TCP/IP protocol to determine the appropriate MSS value for a particular connection.

Generally, TCP ensures reliable delivery of messages. TCP's responsibilities generally include breaking up messages into data bundles, re-sending any lost data bundles to the data receiver, receiving data bundles, querying for data bundles that have not yet arrived, and putting data bundles back in the correct order to form the original message.

Utilizing TCP, each end of a connection has the ability to announce the MSS a network is presently capable of handling. When a TCP connection first opens, both ends on the connection announce their respective MSS to each other and typically agree on the smaller of the MSS sizes to use for the connection. In this example, the data source TCP 106 of the Token Ring Network 115 breaks its messages up into data bundles 110 equal to or less than the smaller Ethernet network MTU wherein connected is the data receiver 100. Each data bundle 110 may include an IP header, a TCP header, and data, all of which are designated as "IP|TCP|Data". The data bundles are sent out onto the network 115, typically over a gateway 122, 124 to relay the data bundles over the network 112 to the destination network 120.

However, the two communicating ends of a connection may not necessarily be aware of all the particular network MTUs for all the different networks forming the connection in between the communicating devices. For instance, the connection may at some point be transported over a network not capable of transmitting data bundles 110 equal in size to the selected Ethernet network MTU. To transmit the data bundles 110 to the destination network 120, the gateway 122, 124 may transmit data over a transport network 112 capable of handling only data bundles that are less than Ethernet network MTU size. In addition to the local area networks 115, 120 serving the CPE devices, the transport network may be formed by the various gateways, bridges, routers 122, 124 and transport network 112 carrying data bundles between the networks 120, 115. As a result, a connection may include networks that have limits on the message MTU of data bundles they can transmit. Consequently, the gateway 122 fragments or breaks the data bundles 1110 up into fragments that can be handled by the network 112. The first fragment (i.e., SYN is set) preferably contains an IP header, a TCP header, and data designated as "IP|TCP|Data". All remaining fragments have an IP header with data designated as "IP|Data".

STE 126 in the network preferably receives fragments sent from a data source 102 to a data receiver 100. From the first fragment (containing "IP|TCP|Data") the STE 126 obtains the MSS from the TCP header containing the MSS of the fragments. STE 126 stores the MSS value and resets the connection between the data source 102 and the data receiver 100 by setting RST in the TCP header of a data bundle and sending the data bundle to the data source 102 and data receiver 100. By resetting the connection, the data source 102 preferably starts a second connection wherein the STE 126 places the MSS in the announcement to store the appropriate MSS for the connection. The second connection then uses the stored MSS to complete the connection session.

Thus in relation to the method of FIG. 4 and now referring to FIG. 6A, STE 64 receives a fragment from a data source 500 sending a fragmented message 502 to a data receiver 550 on the first connection. STE 64 can be a network device placed in the path of the message or can be embodied within any network device such as a gateway device, firewall, classifier, and even the data source 500 or data receiver 550. STE 64 obtains the MSS of the fragment 502 from the TCP header, and stores the MSS value into memory, a data structure or in a database according to the data source 500 and data receiver 550 addresses. By storing the MSS value in a memory location such as in a database, STE 504 can use the value for reestablishing the connection (i.e., the second connection) and for any future connections made between the data source 500 and data receiver 550. For instance, STE 504 identifies the Source 500 and Destination 550 address from fields (220 and 222 in Table 4) of the IP header.

Referring now to FIG. 6B, STE 64 closes the first connection by setting the RST bit located in the TCP header of a data bundle 510. The data source 500 and data receiver 550 receive the data bundle 510 with the RST bit set and the data source 500 and the data receiver 550 accordingly attempts to reestablish the connection, thus initiating a second connection.

Referring now to FIG. 6C, STE 64 intercepts the announcement 512 from the data source 500 to the data receiver 550 of the second connection and changes the MSS to correspond to the appropriate stored value (i.e., MSS of 'A' in this example). Preferably checksum is also recalculated. Likewise, referring to FIG. 6D, STE 64 intercepts the announcement 514 from the data receiver 550 to the data source 500 of the second connection and changes the MSS to correspond the stored value (i.e., MSS of 'A' in this example) and preferably recalculates its checksum. The data source sends data bundles on the second connection using the stored MSS (i.e., MSS of 'A' in this example), thus reducing fragmentation.

Referring to FIG. 7, an alternative method for reducing fragmentation between a data source and a data receiver through determining the appropriate MTU size between a data source and data receiver connection is shown. This embodiment provides the STE the ability to determine the appropriate MTU size for sending messages so that the STE can optimize the appropriate MTU. At step 600, the announcement of a connection (e.g., SYN 140 in Table 1 is set) between the data source and the data receiver is intercepted. At step 602, STE predicts a determined MSS for the connection. Preferably, the predicted MSS is larger than the MSS for the connection in order to cause fragmentation of a packet. At step 604, STE sets the no-fragment option in a signal (e.g., such as a ping) and broadcasts the signal including the predicted determined MSS to the data source and the data receiver.

At step 604, if a fragment-free signal response is transmitted over the network, such as when the message MTU and consequently the MSS is within the network MTU over the entire connection, the determined maximum segment size at step 608 is preferably stored. Thus, the stored determined maximum segment size reduces fragmentation in the first fragment-free connection and future connections between said data source and said data receiver.

Thus, STE preferably predicts a large MSS, such that the message MTU with the no-fragment option set cannot fit over the network MTU between a data source and a data receiver. If the MSS is set so that the data bundle message MTU is larger than the network MTU and the no-fragment option is set, the data bundle will not be sent. The STE is notified that the current MSS is too large. The STE will try to re-send the signal while decreasing the MSS, preferably, until the STE can send a data bundle message that can fit over the smallest MTU of the network connection from the data source to the data receiver and vice versa. Thus, the STE continues to attempt to send data bundles of decreasing MTU sizes until a data bundle is successfully sent through the network (i.e., a fragment-free message). STE captures the first signal response and stores the MSS value from the fragment free signal response that was able to make it over the network. This MSS size is the maximum size that can be used over the connection between the data source and data receiver without fragmenting a message. The STE may use the method for determining the appropriate MTU size to use for connections between a data source and data receiver.

It should be understood that the method may also select a smaller MSS and increase the MSS until fragmentation of a data bundle transmitted over the connection occurs. The data bundle size can be stored and MSS prior to the data bundle that caused fragmentation over the connection is utilized as the appropriate MSS size.

Network Address Translation ("NAT") is a method by which network addresses are mapped from one network, typically an external network (e.g., the Internet) to another, typically an internal network with private or unregistered network addresses (e.g., Local Area Network, "LAN"). The purpose of NAT is to provide IP address translation from the external network to the private network. Thus, the private network can transparently communicate with the external network via a NAT device, such as a router that employs the NAT method.

NAT correlates addresses in a private network with addresses in a global network to provide routing for the data bundles transmitted between networks. To complete the correlation in many cases may require information in a Transport layer header. Thus, in many cases, the fragments must be re-assembled so the NAT device can transparently route the data bundle onto the private network. Such assembling is time consuming and can require an extension of TCP termination time. Similarly, NAT devices must clean up any unused fragments after TCP closes the connection due to a TCP time out.

Port Address Translation ("PAT") is a method by which port addresses are mapped from one network, typically an external network (e.g., the Internet) to another, typically an internal network with a private or unregistered network addresses (e.g., Local Area Network, "LAN"). Recall that port addresses (120 and 122 given in Table 2) are given in the TCP header (94 in FIG. 4). Thus, PAT is accomplished using information in the transport header (94 in FIG. 4).

Many devices running applications such as NAT, PAT, and Internet security ("IPSEC") require data with information included in an IP header and TCP header. Therefore, if the device is encountered with fragments, it must first re-assemble them before the data is further processed. Thus, to reduce fragmentation, STE can be placed in the network running applications such as NAT, PAT, and IPSEC. Using methods described herein, STE can change the MSS of a data bundle transmitted over the network. The STE used to implement the methods described herein is a device, such as a microprocessor, read-only memory ("ROM") device, programmable logic device ("PLD"), and/or logic gate(s) that may include functionality such as forwarding data bundles between hosts and other gateways in order to allow other hosts not connected to the same link to communicate. Forwarding is the process by which a device transmits an IP data bundle it has received in order to move the IP data bundle closer to the data receiver.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. A method of managing message size for a connection between a data source and a data receiver on a network comprising the steps of:
   obtaining a determined maximum segment size based on maximum segment sizes of a plurality of packet transport networks between a data source and a data receiver;
   negotiating a maximum segment size for a connection with a data receiver to reduce message fragmentation by altering an announcement, the steps comprising:
   (i) receiving an announcement from said data receiver of a first connection between said data source and said data receiver, wherein said announcement denotes a maximum segment size;
   (ii) when the determined maximum segment size is smaller than the said maximum segment size in said announcement message, generating an altered announcement message by changing said maximum segment size in said announcement of said first connection to the determined maximum segment size to reduce message fragmentation on packet transport between said data source and said data receiver; and
   sending subsequent messages from the data source to the data receiver using the determined maximum segment size.

2. The method of claim 1 further comprising recalculating a checksum of said announcement for use in the altered announcement.

3. The method of claim 1, wherein said announcement comprises a first message of a data stream in said connection.

4. The method of claim 1, wherein said announcement comprises a SYN bit.

5. The method of claim 1, wherein said first connection is one of any virtual connections utilizing TCP/IP between said data source and said data receive.

6. The method of claim 1, wherein changing said maximum segment size comprises changing said maximum segment size in a TCP header in said announcement.

7. The method of claim 1, wherein said determined maximum segment size is pre-programmed into a database.

8. The method of claim 1, wherein said data source comprises customer premise equipment, and wherein said receiver comprises customer premise equipment.

9. The method of claim 1, wherein said determined maximum segment size avoids re-assembly of fragments.

10. A method of reducing message fragmentation for a connection between a data source and a data receiver on a network comprising the steps of:
    receiving a first message fragment of a first connection between said data source and said data receiver;
    storing a maximum segment size of said first message fragment of said first connection, wherein said maximum segment size exists in accordance with said first message fragment;
    resetting said first connection, wherein resetting said first connection initiates a second connection;
    receiving an announcement of said second connection;
    generating an altered announcement of said second connection by placing said maximum segment size into said announcement of said second connection; and
    sending subsequent messages from the data source to the data receiver using the said maximum segment size to reduce message fragmentation between said data source and said data receiver.

11. The method of claim 10 further comprising recalculating a checksum of said announcement of said second connection.

12. The method of claim 10, wherein said first message fragment comprises a first message of a data stream in said connection.

13. The method of claim 10, wherein said first message comprises a set SYN bit.

14. The method of claim 10, wherein said first connection is one of any virtual connections utilizing TCP/IP between said data source and said data receiver.

15. The method of claim 10, wherein said second connection is a connection following said first connection.

16. The method of claim 10, wherein storing said maximum segment size comprises storing said maximum segment size in a database.

17. The method of claim 10, wherein resetting said first connection comprises closing said first connection by setting a RST bit.

18. The method of claim 10, wherein resetting said first connection initiates said second connection.

19. The method of claim 10, wherein placing said maximum segment message size into said announcement of said second connection comprises placing said maximum segment message into a TCP header within said announcement of said second connection.

20. The method of claim 10, wherein said data source comprises customer premise equipment, and wherein said data receiver comprises customer premise equipment.

21. A method of reducing message fragmentation between the data source and the data receiver connected by a network comprising the steps of:
- intercepting a first announcement of a first connection between said data source and said data receiver;
- predicting a predicted maximum segment size for said first connection, wherein said predicted maximum segment size is placed in a signal;
- sending said signal with a no-fragment option set to said data source and said data receiver;
- storing a determined maximum segment size, whereupon said determined maximum segment size results from a fragment free signal response; and
- receiving subsequent announcements of connections and inserting said determined maximum segment size into said subsequent announcements of connections to reduce message fragmentation between said data source and said data receiver.

22. A method in claim 21, wherein said determined maximum segment size is iteratively predicted until a fragment free signal response is received.

23. A method in claim 21, wherein said no-fragment option is set in an IP header within said signal.

24. An apparatus for reducing message fragmentation between a data source and a data receiver connected by a network comprising:
- a network device connected to the network, wherein said network device intercepts communications between said data source and said data receiver, wherein said communications denote a maximum segment size for the network, and wherein said network device changes the maximum segment size of said communications to a determined maximum segment size that provides a reduction of message fragmentation in data transmission between said data source and said data receiver; and
- a storage device connected to said network device for storing said determined maximum segment size for data transmitted between said data source and said data receiver; wherein said network device stores said determined maximum segment sizes in accordance to data communication between said data source and data receiver.

25. An apparatus in claim 24, wherein said announcement comprises a first message, said first message fragment comprises a first message of a data stream in said connection, and wherein said first message comprises a set SYN bit.

26. An apparatus in claim 25, wherein the network device iteratively predicts said determined maximum segment size.

27. An apparatus as claimed in claim 25, wherein said storage device comprises a database.

28. An apparatus of reducing fragmentation between a data source and a data receiver as claimed in claim 25, wherein said network device comprises a gateway device.

* * * * *